United States Patent Office 3,374,529
Patented Mar. 26, 1968

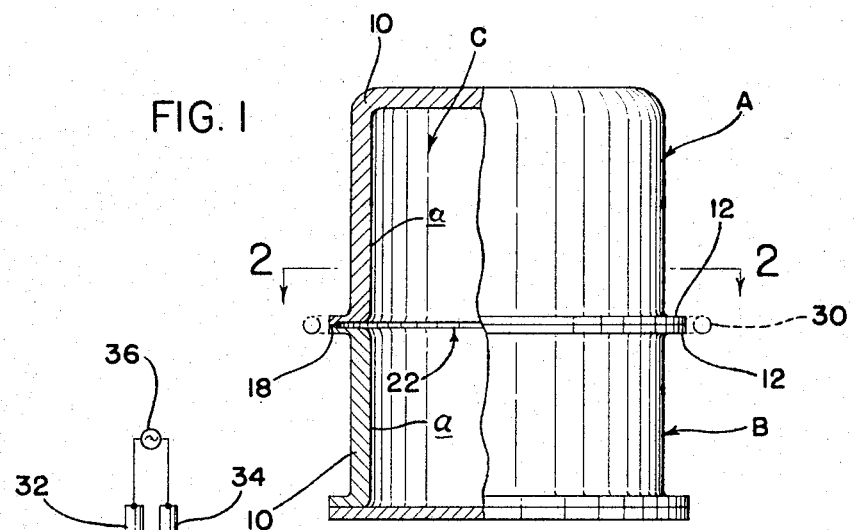
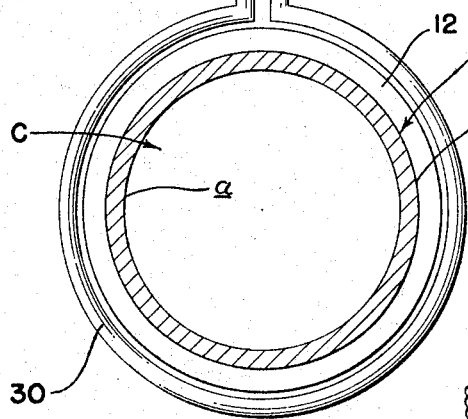
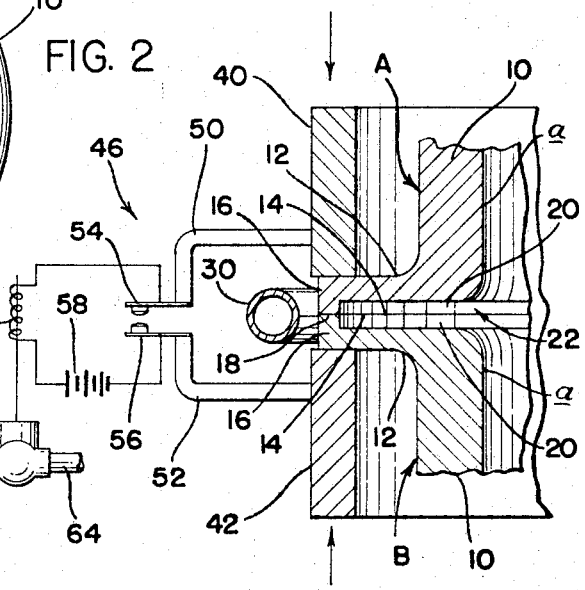
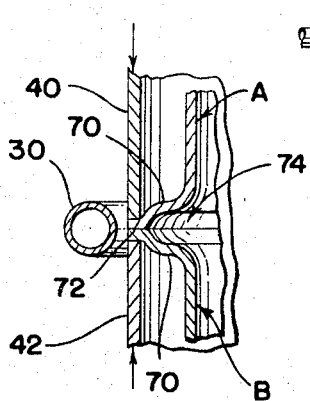

3,374,529
METHOD OF BUTT WELDING
Harry B. Osborn, Jr., University Heights, and Harry V. Beronius, Kenton, Ohio; said Osborn assignor to Park-Ohio Industries, Inc., a corporation of Ohio
Filed Feb. 7, 1963, Ser. No. 256,939
4 Claims. (Cl. 29—482)

ABSTRACT OF THE DISCLOSURE

There is provided a method of butt welding the matching, peripheral joining flanges of two generally hollow workpieces, such as the housing portions of a sealed compressor. Ribs are provided around the flanges adjacent the outside thereof, and the ribs are inductively heated to a temperature below the melting point of the material forming the ribs without heating the flange to a great extent. Thereafter, the ribs are pressed together to weld them by pressure.

DISCLOSURE

The present invention pertains to the art of welding and more particularly to a method of butt welding opposed edges of two workpieces.

The present invention is particularly applicable to butt welding the opposed edges of two cylindrical members of the type forming the housing around a sealed compressor unit as used in mechanical refrigerators and it will be discussed with reference thereto; however, it is to be appreciated that the invention has much broader applications and may be advantageously used in butt welding the opposed edges of various workpieces. For instance, the present invention may be utilized in butt welding adjacent sections of pipes or conduits.

In the manufacture of sealed compressor units of the type used in mechanical refrigerators, difficulty has been encountered in providing a satisfactory weld between adjacent sections of the outer housing which encases the compressor and the electric motor for driving same. The conventional methods of butt welding, when used for welding the adjacent sections of these housings, often created molten metal at the welded joint which molten metal splattered into the internal portion of the compressor housing where it caused shorting or other damage to the motor and damage to the other elements of the compressor. Further, when these methods of butt welding were used, the heat created adjacent the internal surfaces of the housing often caused damage to the insulation of the electrical components within the housing. Because of the excessive heat and random splattering of molten metal at the butt welded joint, the known butt welding methods were not entirely satisfactory for welding these sealed housings of compressor units and various special methods have been utilized in attempting to eliminate these difficulties from this special butt welding operation. These special methods for butt welding have not been completely successful.

The present invention is directed toward a method for butt welding the opposed edges of two workpieces wherein the heat energy is concentrated adjacent one surface of each of the workpieces so that the other surfaces of the workpieces are free from relatively high temperatures.

In accordance with the present invention there is provided a method for butt welding opposed edges of two workpieces without a concentration of heat energy adjacent one surface of each workpiece. The method basically comprises the step of providing a recess between the opposed edges and adjacent the one heat protected surface of the workpieces.

The primary object of the present invention is the provision of a method for butt welding the opposed edges of two workpieces which method reduces the heat energy or temperature and eliminates splattering of molten metal adjacent at least one surface of each of the workpieces.

Another object of the present invention is the provision of a method of butt welding the opposed edges of two workpieces which method reduces the heat energy and eliminates splattering of molten metal adjacent at least one surface of each of the workpieces by providing an undercut on at least one opposed edge of a workpiece and adjacent the heat protected surface which undercut forms a recess at the protected surface when the two workpieces are abutted.

Still a further object of the present invention is the provision of a method for butt welding the opposed edges of two workpieces adapted to form a sealed chamber which method prevents high concentration of heat at the internal surface of the workpieces and eliminates splattering of molten metal into the sealed chamber during the butt welding operation.

A further object of the present invention is to provide a method as described above which method requires less power and can be accomplished in a lesser time than heretofore known methods of butt welding adjacent portions of a sealed chamber.

Still another object of the present invention is the provision of a method of butt welding the opposed edges of two workpieces which method reduces heat concentration and eliminates splattering of molten metal adjacent one surface of each of the workpieces by providing a flange on each workpiece adjacent the opposed edges and forming said flanges so that a recess is created at the protected surfaces when the flanges are abutted.

These and other objects and advantages will become apparent from the following description used to illustrate the preferred embodiment of the invention as read in connection with the accompanying drawing in which:

FIGURE 1 is a somewhat schematic, partial plane view illustrating the preferred embodiment of the present invention;

FIGURE 2 is a somewhat schematic, cross-sectional view taken generally along line 2—2 of FIGURE 1;

FIGURE 3 is a partial, somewhat schematic, cross-sectional view illustrating in more detail the preferred embodiment of the present invention; and FIGURE 4 is a view similar to the view shown in FIGURE 3 and illustrates a modification of the preferred embodiment of the invention as shown in FIGURES 1–3.

Referring now to the drawing, wherein the showings are for the purpose of illustrating a prefered embodiment of the invention only and not for the purpose of limiting same, FIGURES 1 and 3 show a pair of thin walled workpieces A, B which are to be butt welded at their opposed ends. Although the workpieces may take a variety of structural shapes and may be used in a variety of environments, in accordance with the disclosed embodiment of the present invention, the workpieces A, B are adapted to be butt welded together to form an internal, sealed chamber C which chamber has positioned therein various components which can be damaged by high temperatures and/or by splattering of molten metal from the welded joint. Although it is appreciated that workpieces A, B may be utilized in forming a variety of sealed chambers C, it has been found that the method to be hereinafter described in detail is especially adapted for butt welding workpieces A, B when these workpieces form the compressor housing for a refrigerator unit. The important feature of the workpieces A, B, irrespective of their intended use, is that each of these workpieces has a surface $a$ that is to be substantially isolated from a concentration of heat energy and which surface is to be free from molten metal which may splatter from the welded joint. The present invention is directed toward a method of butt welding workpieces A, B so that this end result can be consistently obtained without an elaborate butt welding apparatus.

For simplicity, the workpieces A, B are illustrated as having substantially identical shapes so that like numbers refer to like portions of the two workpieces. Each of the workpieces has a body 10 that may take a variety of shapes and which body terminates in a radially extending flange 12 that defines opposed edges 14 between the workpieces A, B. The method to which the present invention is directed is a method for butt welding the opposed edges 14 of the workpieces to form the workpieces into a substantially unitary structure. In the past, the opposed edges have been flat and have extended inwardly to the internal surfaces $a$. As the edges 14 were butt welded by various methods, it was necessary, to provide a quality weld, to heat the entire width of the edges 14. Consequently, the edges adjacent surfaces $a$ were heated to substantially the same extent as the opposed edges at the outer surfaces of the workpieces. This concentrated a substantial amount of heat energy at the inner surfaces $a$ which heat energy deleteriously affected the components within chamber C. Further, it was often necessary to raise the temperature of opposed edges to the molten temperature of the metal forming the workpieces; therefore, it was common to create a certain amount of molten metal adjacent the surfaces $a$ which molten metal tended to splatter into the chamber C, especially when an upsetting pressure was applied at the opposed edges 14.

The present invention eliminates these difficulties by providing radially offset, axially extending ribs 16 adjacent the outermost portions of flanges 12 which ribs are abutted at a common edge 18. In essence, the ribs 16 form undercut portions 20 on each workpiece A, B, which undercut portions are adapted to form a recess 22 when the opposed edges 14 of the separate workpieces are brought together. Accordingly, the opposed edges 14 of the workpieces A, B now comprise an abutting edge 18 and a recessed or undercut portion 22 which recessed portion 22 is adjacent the inner surfaces $a$ of the respective workpieces.

As the workpieces are abutted in a manner shown in FIGURE 3, the abutted workpieces may be positioned concentric with respect to an inductor 30, which inductor is shown, in accordance with the present invention, as a single turn inductor having leads 32, 34 appropriately connected onto a source of high frequency current 36. (See FIGURE 2.) The inductor is axially aligned with respect to the abutting edge 18 so that the inductor 30 will have efficient magnetic coupling with the ribs 16. Radially aligned and axially spaced from ribs 16 there is provided, in accordance with the present invention, a pair of rams 40, 42 which may be operated in appropriate means to provide an upsetting pressure at edge 18 so that the ribs 16 can be easily upset after they have been heated.

To accurately control the amount of upset imparted to ribs 16, there is provided an upset control device 46 which may take a variety of structural forms including mechanical stops between rams 40, 42. In accordance with the disclosed embodiment of the present invention, the upset control device 46 comprises two support arms 50, 52 adapted to be moved with rams 40, 42 and carrying electrical contacts 54, 56. The electrical contacts are adapted to establish continuity in an electrical circuit including an appropriate battery, or other energy source, 58 and a solenoid 60. It is obvious that when rams 40, 42 come together to a predetermined extend which will upset ribs 16 the desired amount, the contacts 54, 56 will establish continuity in the electrical circuit which will energize solenoid 60. In the disclosed embodiment of the invention, solenoid 60, when energized, actuates valve 62 to prevent flow of hydraulic fluid through a pressure line 64. Accordingly, the movement of the rams 40, 42 is halted. It is appreciated that various other devices could be utilized for accomplishing the purpose of limiting the movement of rams 40, 42.

In operation of the method as described, the workpieces are abutted at opposed edges 14 which opposed edges include a radially outward abutting edge 18 and an inward recess 22 adjacent surfaces $a$ which surfaces are to be protected from a concentration of heat energy and from splattering of molten metal. The rams 40, 42 are positioned directly opposite the radially outward ribs 16 and the inductor 30 is essentially located in the axial plane of edge 18. After so positioning and supporting workpieces A, B, source 36 causes a high frequency current to flow through inductor 30. Since the inductor is positioned relatively close to the ribs 16, efficient magnetic coupling is established between the inductor and the radially offset ribs 16. As is obvious from FIGURE 3, the magnetic flux lines tend to extend through edge 18 at the ribs 16. Since recess 22 forms a magnetic path of low permeability, there is little tendency for magnetic flux lines to extend between workpieces A, B in the area adjacent surfaces $a$. Since the flux lines are concentrated at ribs 16, these radially offset ribs receive a major portion of the electrical energy transferred from the inductor 30 into the workpieces. Accordingly, a substantial elevation in temperature is realized at the ribs 16 while very little temperature increase is created opposite recess 22 at the inner, or protected, surfaces $a$. The air or other atmosphere encased within chamber C is present in recess 22 and this atmosphere causes a cooling effect on the radially inward portions of flanges 12. For these reasons, the inductor 30 does not create a substantial increase in temperature of the opposed edges 14 adjacent the surfaces $a$. Most of the heat energy is created in the ribs 16 which are to be later upset.

A sufficient upsetting pressure is exerted on the abutting ribs by rams 40, 42 which pressure, in accordance with the preferred embodiment of the present invention, is approximately 2,300 p.s.i. For the most uniform results, it has been found that the upsetting pressure should be maintained substantially constant during the entire upsetting operation of the ribs 16. It is appreciated that various power means may be provided for creating the upsetting pressure between rams 40, 42; however, in accordance with the disclosed embodiment of the invention, hydraulic pressure is provided through pressure line 64 which pressure is maintained at a sufficient level to create the desired upsetting pressure between the relatively movable rams. The inductor 30 induces enough energy into the ribs 16 so that the temperature of ribs 16 is increased to an upsetting temperature which is not above the molten temperature of the metal forming the workpieces. After the ribs are so heated they are upset by the action of rams 40, 42 until device 46 indicates that the proper upset has been obtained. Thereafter, the pressure on rams 40, 42 is released and the workpieces A, B are allowed to cool.

Referring now to FIGURE 4, there is disclosed a slight modification of the invention as disclosed in FIGURES 1–3. The workpieces A, B are provided with radially outwardly extending spun flanges 70 which are joined at abutting edge 72 and have therebetween an appropriate recess 74 which serves the same purpose as recess 22 in the embodiment of the invention shown in FIGURES 1–3. The method of butt welding the workpieces as shown in FIGURE 4 does not differ appreciably from the method used in butt welding the workpieces shown in FIGURES 1–3.

In accordance with the present invention, the opposed edges 14 of the workpieces A, B are provided with an appropriate recess 22 adjacent the surfaces $a$ which surfaces are to be protected from a concentration of heat energy and from splattering of molten material. This recess creates a radially outward edge 18 which can be upset and, thus, butt welded without deleterious effects at the surfaces a.

Various changes may be made in the structural features utilized in describing the present invention without departing from the intended spirit and scope of the invention as defined in the appended claims.

Having thus described our invention, we claim:

1. A method for butt welding the matching, peripheral joining flanges of two generally hollow workpieces, each of said flanges having relatively large transverse dimensions extending from an inner edge adjacent the interior of said workpieces and an outer edge remote from said interior, said method comprising the steps of: providing a continuous rib integrally formed on at least one of said flanges and facing the other, said rib being adjacent said outer edge and having a transverse dimension substantially less than the dimensions of said flanges; aligning said workpieces with said flanges facing each other and with said rib extending between said flanges; inductively heating primarily said flanges to a temperature below the melting point of the material of said flanges; simultaneously, applying a pressure to upset said rib and cause pressure welding of said flanges at only the area of said rib; and, controlling said pressure application to prevent welding of said flanges adjacent said inner edge.

2. A method for butt welding opposed matching, peripheral edges of two generally hollow workpieces without a concentration of heat energy adjacent the interior surface of each of the workpieces, said method comprising the following steps: providing an undercut portion at least at one of said opposed edges and adjacent said heat protected surfaces, abutting said edges so that the undercut portion forms a recess between said edges and adjacent said protected surfaces, inductively heating primarily said edges at the surfaces opposite said heat protected surfaces to a temperature below the melting point of the material forming said workpieces, simultaneously, applying an upsetting pressure at said opposed edges to weld said edges, and controlling said upset pressure to prevent welding of said edges at said recess.

3. The method as defined in claim 2 wherein said upsetting pressure is approximately 2,300 p.s.i.

4. A method for butt welding the opposed edges of two hollow, thin walled workpieces having identical peripheral without a concentration of heat energy adjacent the inner surfaces of said workpieces, said method comprising the following steps: providing a rib on each of said opposed edges and extending around said peripheries at a position adjacent the outer surface of said workpieces, abutting said ribs to form a recess extending around the peripheries of said workpieces and adjacent the inner surfaces thereof, inductively heating primarily the abutting ribs to a temperature below the melting point of the material forming said ribs, simultaneously, applying an upsetting pressure to said ribs, and controlling said upset pressure to prevent welding of said edges at said recess.

References Cited

UNITED STATES PATENTS

| | | | |
|---|---|---|---|
| 928,701 | 7/1909 | Rietzel | 219—93 |
| 2,481,096 | 9/1949 | Fentress | 219—93 X |
| 2,625,637 | 1/1953 | Garner et al. | 219—9.5 X |
| 2,798,927 | 7/1957 | Lefcourt et al. | 219—9.5 |
| 2,803,732 | 8/1957 | Wade et al. | 219—9.5 X |
| 2,892,914 | 6/1959 | Rudd | 219—9.5 |

JOHN F. CAMPBELL, *Primary Examiner.*